No. 852,636. PATENTED MAY 7, 1907.
A. R. SIMMERLY.
DIE.
APPLICATION FILED SEPT. 21, 1906.

Witnesses
M. A. Schmidt
Geo. E. Few

Inventor
Anthony R. Simmerly.
By Milo B. Stevens
Attorneys

THE NORRIS PETERS CO., WASHINGTON, D. C.

UNITED STATES PATENT OFFICE.

ANTHONY R. SIMMERLY, OF CLEVELAND, OHIO.

DIE.

No. 852,636.  Specification of Letters Patent.  Patented May 7, 1907.

Application filed September 21, 1906. Serial No. 335,601.

*To all whom it may concern:*

Be it known that I, ANTHONY R. SIMMERLY, a citizen of the United States, residing at Cleveland, in the county of Cuyahoga and State of Ohio, have invented new and useful Improvements in Dies, of which the following is a specification.

This invention is a die and die block intended for use in punching, cutting and shaping machines, and particularly those machines designed for the production of small metal articles such as pipe hangers, straps, clips, and the like, out of strips of sheet metal.

The object of the invention is to reduce the number of operations necessary to form the articles, and this is accomplished by the use of a die which punches, cuts and shapes, at each stroke, the construction being such that while one piece is being punched at one side of the die the preceding piece is being shaped and finished at the other side of the die.

The invention is illustrated in the accompanying drawings, in which

Figure 1:
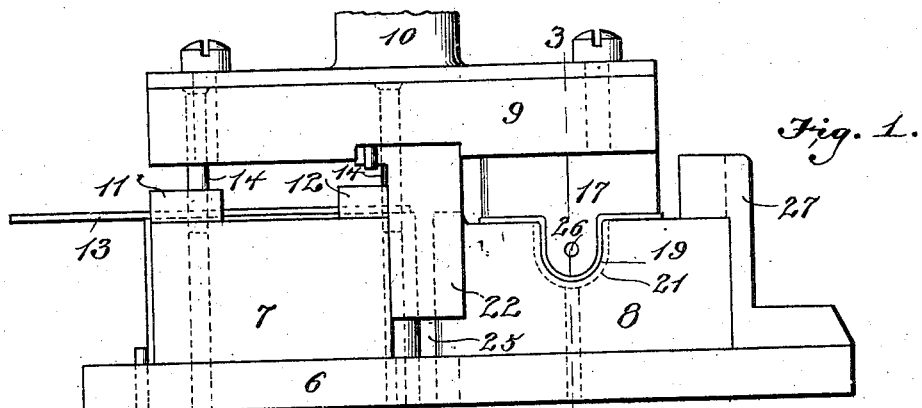
Figure 2:
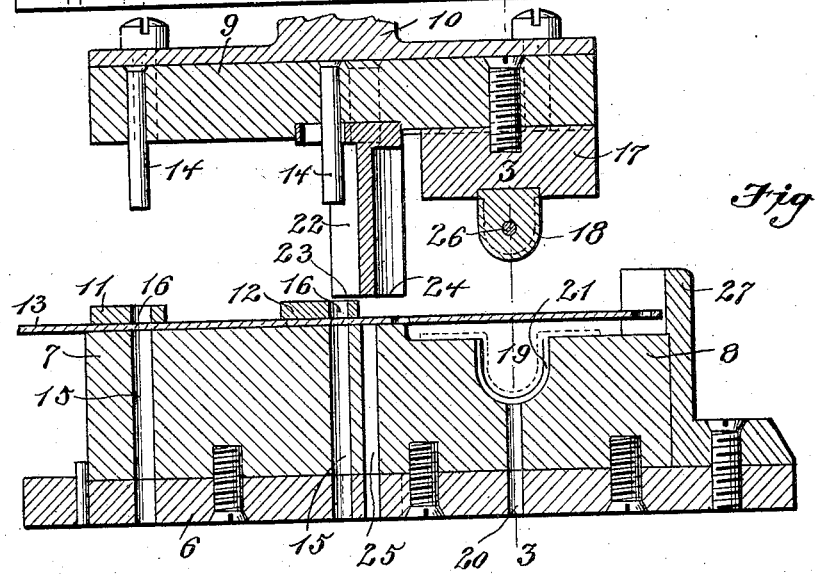
Figure 3:
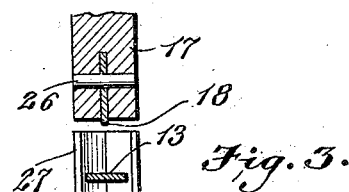
Figure 4:
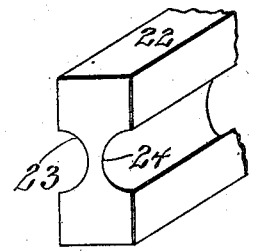

Figure 1 is a side elevation of the die at the limit of the down stroke of its movable member. Fig. 2 is a vertical cross section with the movable member lifted or retracted. Fig. 3 is a section on the line 3—3 of Figs. 1 and 2. Fig. 4 is a perspective view of the cutter.

Referring specifically to the drawings, 6 indicates a base plate and 7 and 8 the lower or female die blocks mounted thereon.

9 is a die press head movable up and down above the die blocks and having a shank 10 for attachment to a plunger or other operating part. The die block 7 has thereon a pair of guides 11 and 12, through and under which the stock 13 is fed from the side. Naturally the guides may be varied to suit the stock, the invention being illustrated in connection with the production of pipe straps or hangers from metal strips.

The die head 9 carries the punches 14 for producing holes in the stock, these punches being carried at one side or side part of the die head, opposite the block 7, and the punches work into openings 15 extending through the block to allow the escape of the slugs. The guides 11 and 12 have similar registering openings as indicated at 16.

The opposite side of the die head carries a male die member 17 which is provided with a rib 18, and this die member works into the opening or shaping recess 19 produced in the lower or female die member 8. An ejector may be operated through the hole 20, if desired. The recess 19 has a groove 21 to receive the rib 18, the strap hanger being formed with a longitudinal rib to stiffen its bent portion.

Located between the punches 14 and the shaper 17, is a cutter 22, secured to the head 9, and this cutter has opposite cutting edges as at 23 and 24 to trim the opposite ends of the stock pieces. It works into an opening 25 between the blocks 7 and 8, which opening extends through the base plate to allow the escape of the slugs.

In the construction shown, the rib 18 is produced by an inserted piece set in the part 17 and held by a pin 26. Obviously it may be made integral or otherwise formed. The end guide or stopper is shown at 27, fastened to the base plate beside the block 8.

It will be seen that the surface or top of the shaping die block 8 is in a lower plane than that of the punch die block 7. This is advantageous, for the reason that the shaping block 8 does not have to be touched after it is hardened, whereas the punch die block has to be ground when it becomes dull. By having the latter with a higher surface than the former it can be ground off repeatedly, whereas if it were made the same height it could not be ground because the surface would thus be brought below the surface of the shaping die block and consequently the stock could not be fed from one to the other.

In operation, a preliminary length is punched under the punches 14. The stock is then advanced under the guides 11 and 12 until the end reaches the stop 27. The die head is then depressed and the cutter 22 cuts and trims the adjacent ends of the successive lengths or blanks. The foremost blank is then bent by the shaper 17 into the recess 19, its ends being drawn down onto the die block 8 and shaped therein. At the same time, the next blank is punched by the punches 14 and has its front edge trimmed by the cutting edge 23. After the die block is raised and the complete article ejected from the die block 8, the strip is again advanced to the stop 27, and the operation repeated; and so on indefinitely.

It will be seen that the necessity for cutting, punching and shaping the blanks in two or more separate die presses is avoided, all the operations being simultaneously performed, with a corresponding saving of time and labor.

I claim:

The combination of a punch die block having guides thereon, a shaping die block located beside the same in line with the guides and having a stop at the end, the surface of the shaping die block being in a lower plane than that of the punch die block and having a groove extending thereon, and a die head carrying punches opposite the punch block, a shaping die opposite the shaping block, and a cutter between the punches and the shaping die, the shaping die having a rib opposite said groove.

In testimony whereof I have signed my name to this specification in the presence of two subscribing witnesses.

ANTHONY R. SIMMERLY.

Witnesses:
JOHN A. BOMMHARDT,
EDITH D. COMER.